Feb. 26, 1924.
G. L. HORTON
1,485,225
DIRIGIBLE HEADLIGHT
Filed Aug. 17, 1922
2 Sheets-Sheet 1
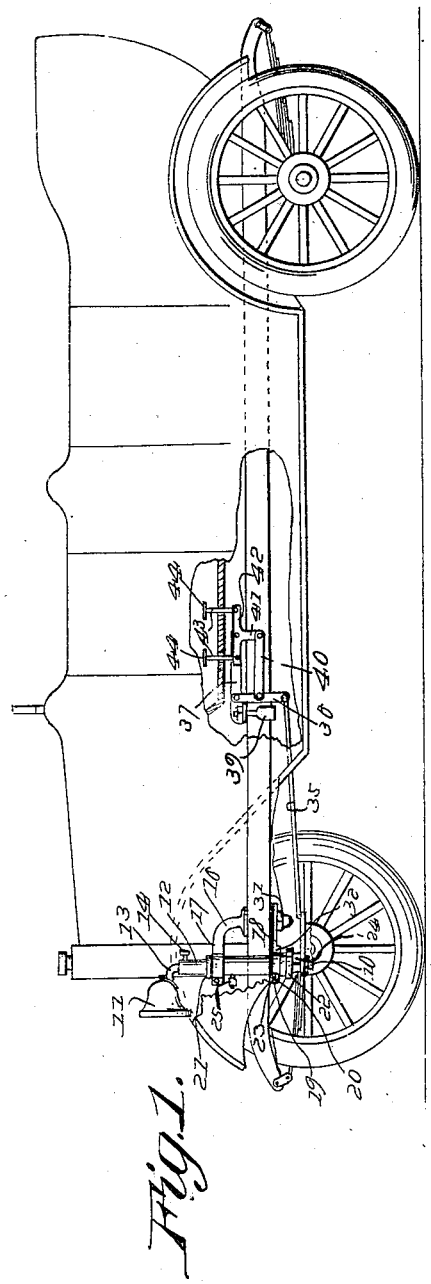
Inventor
George L. Horton,
By
Attorney Feb. 26, 1924.
G. L. HORTON
1,485,225
DIRIGIBLE HEADLIGHT
Filed Aug. 17, 1922
2 Sheets-Sheet 2
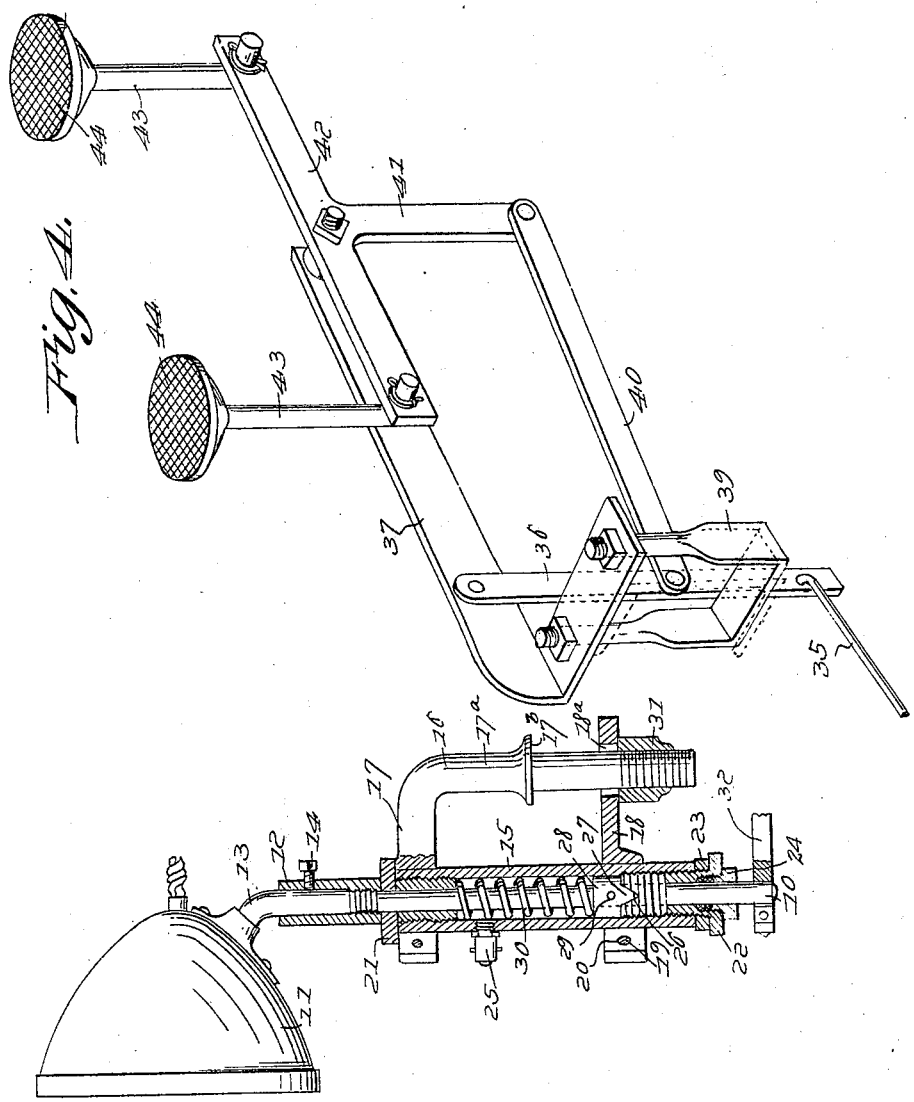
Inventor
George L. Horton,
By 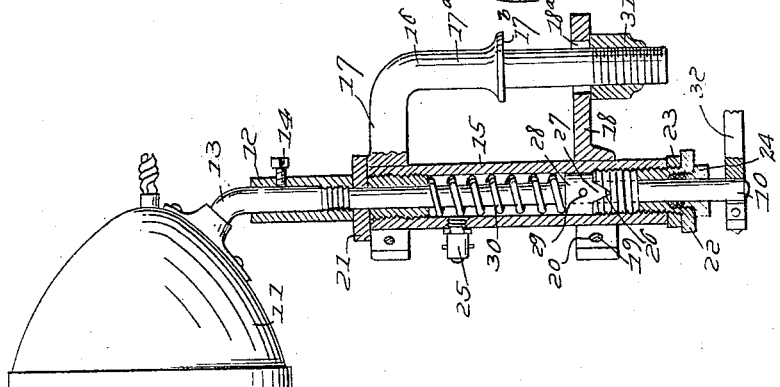
Attorney Patented Feb. 26, 1924.

1,485,225

UNITED STATES PATENT OFFICE.

GEORGE L. HORTON, OF CASEVILLE, MICHIGAN.

DIRIGIBLE HEADLIGHT.

Application filed August 17, 1922. Serial No. 582,411.

*To all whom it may concern:*

Be it known that GEORGE L. HORTON, a citizen of the United States of America, residing at Caseville, in the county of Huron and State of Michigan, has invented new and useful Improvements in Dirigible Headlights, of which the following is a specification.

The object of the invention is to provide a dirigible headlight and direction indicating means particularly adapted for use in connection with automobiles and similar motor-driven vehicles as a means of enabling the driver to direct his headlights in such a way as to illuminate the adjacent portions of cross roads and deflected portions of the road in advance of the machine; and with this object in view the invention consists in a construction and combination of parts of which a preferred embodiment is shown in the accompanying drawings, wherein:—

Figure 1 is a side view, and

Figure 2 is a plan view of a mechanism embodying the invention applied in the operative position to a vehicle which is indicated in outline.

Figure 3 is an enlarged sectional view of the headlight adjusting mechanism.

Figure 4 is a detail in perspective of the pedal bracket and connected parts which is adapted for attachment to the side frame bar of the chassis.

In the illustrated embodiment of the invention the spindle 10 which carries the lamp casing 11 and which is provided at its upper end with a sleeve 12 for the reception of the lamp stem 13, secured in place by a suitable set screw 14 or its equivalent, is revolubly mounted in a sleeve 15 supported by a bracket 16 of which the upper and lower arms 17 and 18 are provided with terminal clamps 19 secured in engagement with the sleeve by bolts 20. Bushings 21 and 22 are threaded in the upper and lower ends of the sleeve 15 and preferably washers 23 are interposed between the flange of the lower bushing and the adjacent end of the sleeve to permit of successive removal thereof to take up lost motion due to wear, and a packing nut 24 is carried by the lower bushing to maintain an oil tight joint with the spindle so that the sleeve may constitute a suitable reservoir for grease or lubricating oil adapted to be supplied in accordance with the Alemite system through a nipple 25. The lower bushing 22 is provided with a centering notch 26 for engagement by a centering lug 27 on a collar 28 which is secured by means of a pin 29 or its equivalent to the lamp spindle, and a coiled spring 30 interposed between the inner end of the upper bushing 21 and said collar serves to yieldingly hold the spindle in a depressed position and by the interlocking engagement of the lug 27 and seat 26 to normally hold the spindle with the lamp carried thereby in a forwardly directed position. The upper arm 17 of the bracket is provided with a depending extension 17$^a$ extending through an opening 18$^a$ in the arm 18 and provided with a shoulder 17$^b$, and the lower threaded extremity of said extension is adapted to be engaged by a nut 31 as a means of securing the bracket to the frame of the vehicle. The opening 18$^a$ is elongated and thus the loosening of the nut 31 will permit the adjustment longitudinally of the arm 18, thereby effecting movement of the lower end of the sleeve 15 either forwardly or rearwardly for the purpose of alining the lamp spindle for the purpose of disposing it to direct its rays upon the roadway.

The spindle 10 at each side of the car is provided with a rearwardly directed arm 32 and the extremities of these arms are connected by a tie rod 33 so that a joint swinging movement of the lamp casings in the same direction may be effected, and one of the spindles, preferably that at the driver's side of the car is provided with an operating arm 34 with which is connected a control rod 35 extending rearwardly to a swinging arm 36 depending from a bracket plate 37 which is secured to a side frame bar 38 of the car by means of a suitable clip 39. Said swinging lever is connected by a suitable link 40 with the arm 41 of a rocking lever 42 to the extremities of which are attached the stems 43 of foot buttons 44. Obviously by the selective pressing of said buttons which are within convenient reach of the foot of the driver, the lever 42 may be swung in opposite directions to correspondingly communicate turning movement in opposite directions to the spindles of the connected lamp casings.

Having described the invention, what is claimed as new and useful is:—

A dirigible headlight having a lamp carrying spindle and means for communicating rotary movement thereto, a bracket provided with a bearing sleeve through which the spindle extends, and spindle centering means mounted in the sleeve for yieldingly holding the spindle with the supported lamp in a neutral position, the means for communicating rotary movement to the spindle consisting of a bracket plate having a clip for securing it to the side frame bar of a car, a rocking lever pivotally engaged at an intermediate point with said bracket plate and provided in the plane of the pivot with a pendant arm, foot buttons provided with stems engaged with the extremities of said rocking lever, a swinging arm carried by said bracket plate remote from the pivot point of the rocking lever and operatively connected with the lamp spindle, and a link connection between the extremity of the pendant arm of the rocking lever at an intermediate point of the swinging arm.

In testimony whereof he affixes his signature.

GEORGE L. HORTON.